United States Patent [19]

Narita

[11] Patent Number: 5,075,858

[45] Date of Patent: Dec. 24, 1991

[54] SHIFT CONTROL SYSTEM FOR AUTOMATIC TRANSMISSION

[75] Inventor: Yasushi Narita, Yokohama, Japan

[73] Assignee: Nissan Motor Co., Ltd., Yokohama, Japan

[21] Appl. No.: 301,352

[22] Filed: Jan. 25, 1989

[30] Foreign Application Priority Data

Jan. 25, 1988 [JP] Japan .................................. 63-12712

[51] Int. Cl.⁵ ............................................. B60K 41/18
[52] U.S. Cl. .................................... 364/424.1; 74/859; 74/866
[58] Field of Search ............... 364/424.1; 74/858, 859, 74/860, 866

[56] References Cited

U.S. PATENT DOCUMENTS

| | | | |
|---|---|---|---|
| 4,680,988 | 7/1987 | Mori | 364/424.1 |
| 4,691,285 | 9/1987 | Takeda | 364/424.1 |
| 4,730,519 | 3/1988 | Nakamura et al. | 74/866 |
| 4,730,521 | 3/1988 | Hayasaki et al. | 74/867 |
| 4,739,483 | 4/1988 | Ina et al. | 364/424.1 |
| 4,845,618 | 7/1989 | Narita | 364/424.1 |

FOREIGN PATENT DOCUMENTS

| | | |
|---|---|---|
| 0288899 | 7/1987 | European Pat. Off. . |
| 61-282252 | 11/1986 | Japan . |
| 2087992 | 6/1982 | United Kingdom . |
| 2147669 | 5/1985 | United Kingdom . |

OTHER PUBLICATIONS

"Full Range Electronic Controlled Automatic Transmission Full Range E-AT" published by Nissan Motor Company Limited Mar. 1987.
(Service Manual) "Nissan Cedric and Gloria" Introduction of E-Y31, EPY-31, EPAY-31 Types, published by Nissan Motor Company Limited Jun. 1987, pp. C-11 –C-60.

Primary Examiner—Parshotam S. Lall
Assistant Examiner—Gary Yacura
Attorney, Agent, or Firm—Foley & Lardner

[57] ABSTRACT

A shift control strategy is disclosed whereby a timing at which the states of shift solenoids are switched is determined based on an actual revolution speed ratio, namely a ratio of revoltion speed of an input shaft of a gear train to a revolution speed of an output shaft thereof, and a predetermined data containing various revolution speed ratio values versus kinds of shift and throttle opening degrees.

6 Claims, 15 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | O | | | | O | O | $\dfrac{1+\alpha_2}{\alpha_2}$ | 3.027 |
| | 2ND. SPEED | | O | O | | O | | O | | $\dfrac{\alpha_1+\alpha_2+\alpha_1\alpha_2}{\alpha_2(1+\alpha_1)}$ | 1.619 |
| | 3RD. SPEED | | O | O | | | | O | | 1 | 1.000 |
| | 4TH. SPEED | | | (O) | | O | | | | $\dfrac{1}{1+\alpha_1}$ | 0.694 |
| ENGINE BRAKE RUNNING STATE | 1ST. SPEED | | | (O) | O | | O | | (O) | | |
| | 2ND. SPEED | | | (O) | O | O | | (O) | | | |
| | 3RD. SPEED | | O | (O) | O | | | (O) | | | |
| | 4TH. SPEED | | O | (O) | | O | | (O) | | | |
| REVERSE | | O | | | | | O | | | $-\dfrac{1}{\alpha_1}$ | -2.272 |

( ) UNRELATED TO POWER TRANSMISSION

|  | SOLENOID 64 | SOLENOID 66 |
|---|---|---|
| 1ST. SPEED | ○ | ○ |
| 2ND. SPEED | × | ○ |
| 3RD. SPEED | × | × |
| 4TH. SPEED | ○ | × |

○ : ON
× : OFF

SHIFT CONTROL SYSTEM FOR AUTOMATIC TRANSMISSION

The present invention relates to a shift control system for an automatic transmission.

JP 62-62047 discloses a known shift control system for an automatic transmission. According to this shift control system, a shift between different speed ratios is made by switching ON/OFF states of shift solenoids. The states of each of the shift solenoids are switched at a timing adjustable by a timer. That is, the states of the solenoid are switched upon expiration of a predetermined length of time that is set by the timer after a shift control unit has determined initiation of a shift in response to a vehicle speed signal and a throttle opening signal, namely after generation of a command for a shift. Different lengths of time are set by the timer versus different throttle opening degree, values and different kinds of shift. For example, in an engine drive running state which is called in this specification as a "power-on" state where engine torque is imparted to an input shaft of a gear train of the automatic transmission, the shift solenoids assume a new state which corresponds to a new speed ratio to be established upon completion of the shift commanded immediately after the shift control unit has determined an initiation of a 1-2 upshift, whereas in an engine brake running state which is called in this specification as a "power-off" state where no engine torque is imparted on the input shaft, the shift solenoids assume the new state upon expiration of a predetermined length of time from the command for the 1-2 upshift.

However, according to this known shift control system, since the states of the shift solenoids are switched upon expiration of a predetermined length of time after a command for a particular shift, there is the likelihood that the timer cannot appropriately set the timing at which the states of the shift solenoids are switched during a shift between two speed ratios bypassing a speed ratio therebetween, such as a shift from the first speed ratio to the fourth speed ratio, (For example, there is the possibility that the states of one of the solenoids are switched, during a 1-4 upshift, at the same timing which the states of another one of the solenoids are switched at during a 1-2 upshift, or the states of the solenoids are switched under the governing of the timer to make a 1-2 upshift, a 2-3 upshift and a 3-4 upshift in this order.), or when a shift is to be initiated when the throttle valve is fully closed from the fully opened state (a shift of this kind often called as "a foot pedal released shift"), the states of the solenoids cannot be switched at an appropriate timing even if a timer value which is used for a power-on shift is set or a timer value which is used for a power-off shift is set. An object of the present invention is to solve these problems.

SUMMARY OF THE INVENTION

According to the present invention, there is employed a shift control strategy whereby a timing at which the states of shift solenoids are switched is determined based on an actual revolution speed ratio, namely a ratio of a revolution speed of an input shaft of a gear train to a revolution speed of an output shaft thereof, and predetermined data containing various revolution speed ratio values versus kinds of shift.

According to one aspect of the present invention, there is provided a shift control system for an automatic transmission including a gear train with an input shaft and an output shaft, the automatic transmission including shift solenoid means assuming a plurality of states corresponding to a plurality of speed ratios established in the gear train, respectively, the automatic transmission effecting a shift between two of said plurality of speed ratios after switching the states of the shift solenoid means, the shift control system, comprising; means for detecting a revolution speed of the input shaft and generating an input shaft revolution speed indicative signal indicative of said revolution speed of the input shaft detected, means for detecting a revolution speed of the output shaft and generating an output shaft revolution speed indicative signal indicative of the output shaft detected, means for computing an actual revolution speed ratio of the revolution speed of the input shaft to the revolution speed of the output shaft based on said input and output shaft revolution speed indicative signals and generating an actual revolution speed ratio indicative signal indicative of said actual revolution speed ratio computed, means for storing reference data containing predetermined reference revolution speed ratio values versus different kinds of shift which are to take place in the automatic transmission and generating, and means for controlling a timing at which the states of the shift solenoid are switched based on said actual revolution speed indicative signal and said data stored.

According to a specific aspect of the present invention, the shift control system includes; means for computing a first derivative, with respect to time of said actual revolution speed ratio and generating a first derivative indicative signal indicative of said first derivative computed, and means for switching the shift solenoid means to a new state which corresponds to a new speed ratio to be established upon completion of a shift when said first derivative indicative signal satisfies a predetermined relationship with a predetermined value and when said shift is identified as an upshift in a power-off state where no torque is imparted to the input shaft.

According to another or further specific aspect of the present invention, the shift control system includes; means for counting a length of time after a command for a shift and generating a time indicative signal indicative of said length of time counted, and means for switching the shift solenoid means to a new state which corresponds to a new speed ratio to be established upon completion of said shift commanded.

BRIEF DESCRIPTION OF THE DRAWINGS

FIG. 2 is a table illustrating which one or ones of frictional devices are activated to play a power transmission role;

DETAILED DESCRIPTION OF THE INVENTION

First Embodiment

Referring to FIGS. 1 to 15, the first embodiment according to the present invention is hereinafter described.

Figure 1:
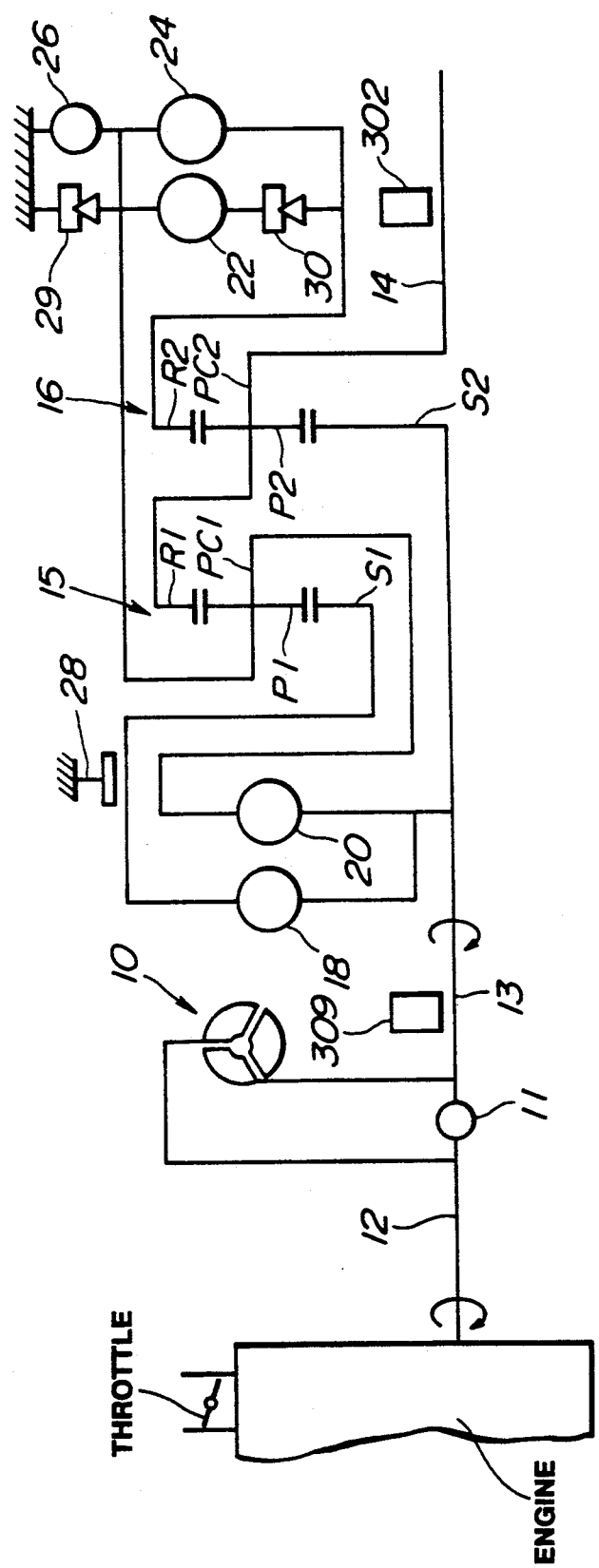
FIG. 1 is a schematic diagram showing a power transmission mechanism of an automatic transmission.

FIG. 1 shows, in a skelton manner, a power train for a 4-speed automatic transmission with its fourth speed as an overdrive. The power train is associated via a torque converter 10 with an output shaft 12 of an engine with a throttle which opens in degrees. It includes an input shaft 13 which a torque is delivered to from the engine output shaft 12, and an output shaft 14 which delivers a driving force to a final drive gear assembly. It also includes a first planetary gear set 15, a second planetary gear set 16, a reverse clutch 18, a high clutch 20, a forward clutch 22, an overrunning clutch 24, a low & reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a carrier PC1 rotatably supporting at least one pinion gear P1 meshing at the same time both sun and ring gears S1 and R1. The planetary gear set 16, on the other hand, comprises a sun gear S2, a ring gear R2, and a pinion carrier PC2 rotatably supporting at least one pinion gear P2 meshing at the same time both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and forward one-way clutch 30. The sun gear S2 is connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow a rotation in a forward direction (the same direction as a direction which the engine shaft 12 rotates in), but preventing a rotation in the opposite reverse direction.

In the above-mentioned power train, rotating states of various rotary elements (S1, S2, R1, R2, PC1, and PC2) of planetary gear sets 15 and 16 are varied by activating the clucthes 18, 20, 22, and 24, and brakes 26 and 28 in different kinds of combination, thereby to vary a revolution speed of the output shaft 14 relative to a revolution speed of the input shaft 13. Four forward speeds and a reverse speed are provided by activating the clutches 18, 20, 22, and 24, and the brakes 26 and 28 in various combinations as shown in FIG. 2. In FIG. 2, the sign ◯ denotes that a particular frictional device such as a clutch or a brake which it is assigned to is activated or engaged, the signs $\alpha 1$ and $\alpha 2$ designate a ratio of number of teeth of the ring gear R1 to that of the sun gear S1 and a ratio of number of teeth of the ring gear R2 to that of the sun gear S2, and a gear ratio is a ratio of a revolution speed of the input shaft 13 to that of the output shaft 14.

Figure 3:
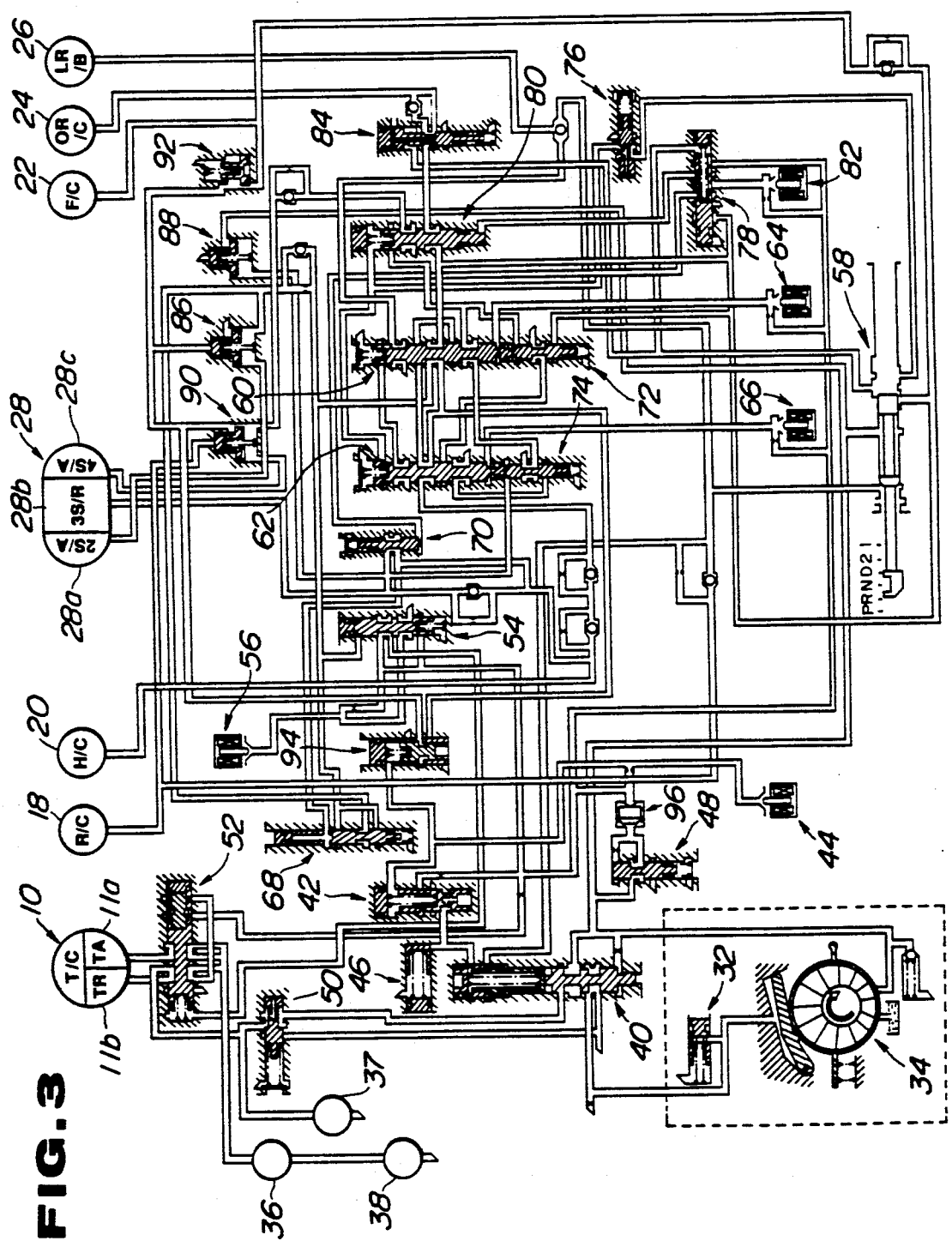
FIG. 3 is a hydraulic circuit diagram showing a hydraulic control system for the automatic transmission.

FIG. 3 shows a hydraulic control system for controlling operation of the above-mentioned power transmission mechanism. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low & reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R01A type which is manufactured by Nissan Motor Company Limited in Japan. The automatic transmission of the RE4R01A type is described in a service periodical No. 578 entitled "NISSAN CEDRIC AND GLORIA", INTRODUCTION OF E-Y31, E-PY31, E-PAY31, Q-UY31 TYPES pages C-11 to C-60, published by Nissan Motor Company Limited on June, 1987. Reference should be made to this publication for full understanding of this automatic transmission.

Figure 4:
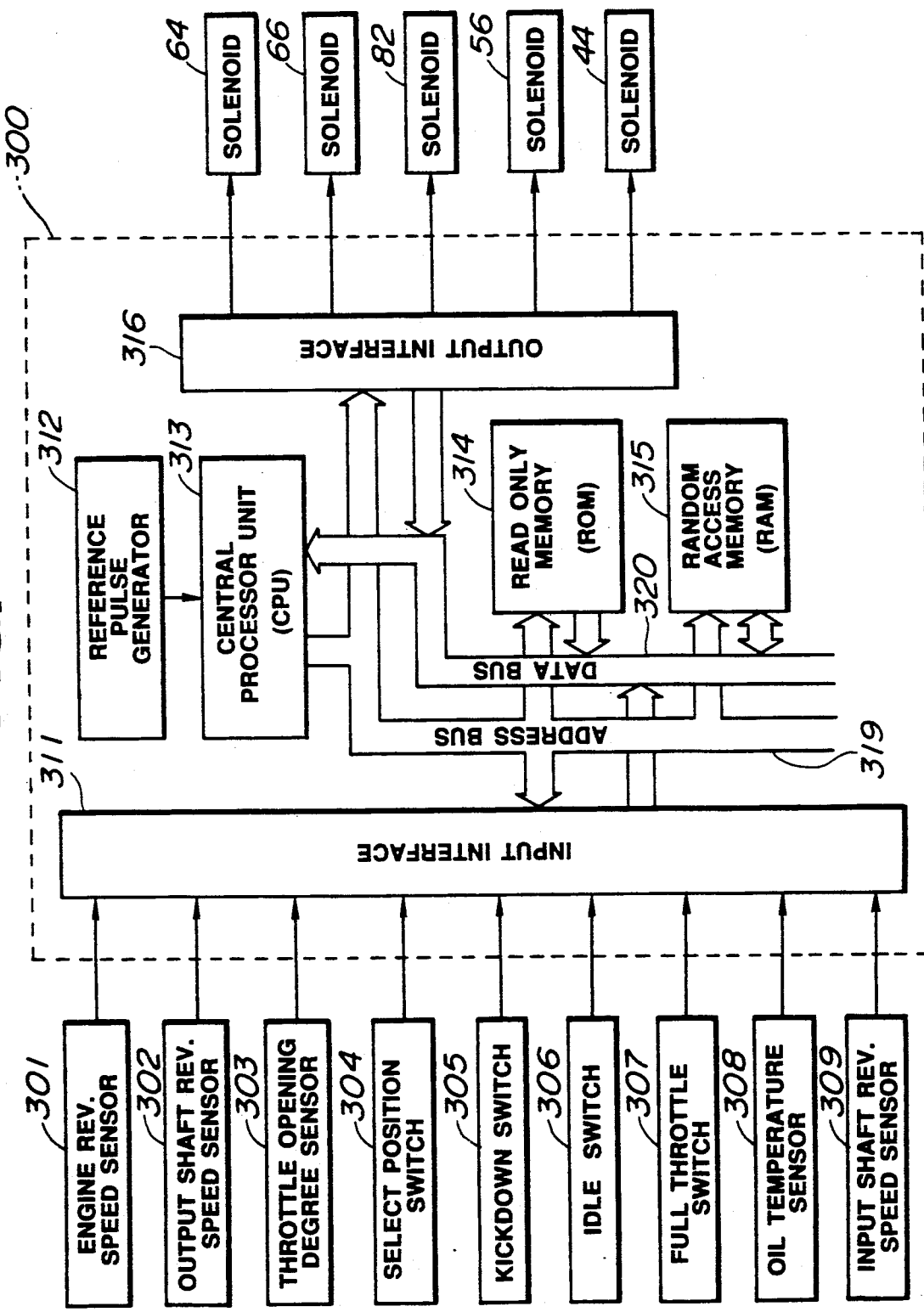
FIG. 4 is a block diagram of a shift control unit.
Figures 5, 7:
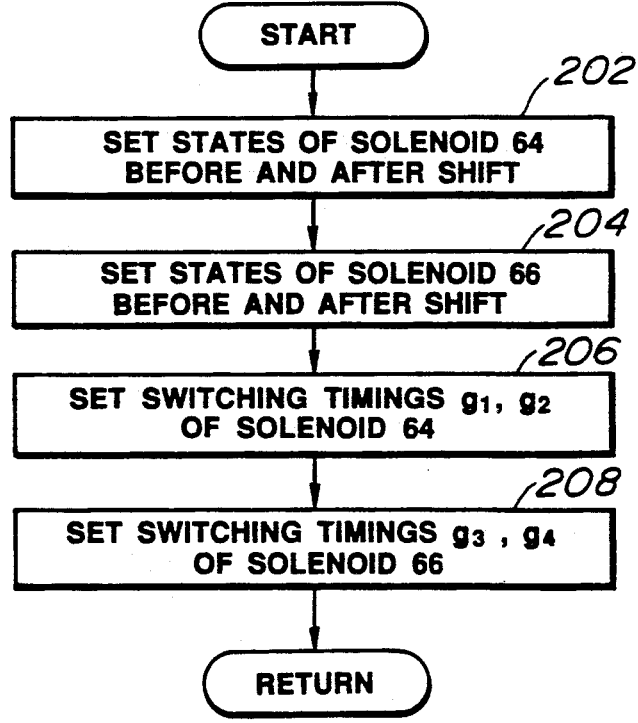
FIG. 5 is a table showing the relationship of the states of shift solenoids versus various speed ratios.
FIG. 7 is a flow chart of a subroutine.

FIG. 4 shows a control unit 300 which controls activation of the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are signals of an engine revolution speed sensor 301, an output shaft revolution speed sensor (a vehicle speed sensor) 302, a throttle opening degree sensor 303, a select position switch 304, a kickdown switch 305, an idle switch 306, a full throttle switch 307, an oil temperature sensor 308, and an input shaft revolution speed sensor (a turbine revolution speed sensor) 309. The output shaft revolution speed sensor 302 detects a revolution speed of the output shaft 14, while the input shaft revolution speed sensor 309 detects a revolution speed of the input shaft 13. The control unit 300 delivers signals to the shift solenoid 64 and 66, overrunning clutch solenoid 82, lock-up solenoid 56, and line pressure solenoid 44. As shown in FIG. 5, various ON and OFF combinations of the shift solenoids 64 and 66 correspond to the speed ratios ranging from the first to the fourth speed ratios, respectively.

Figure 6:
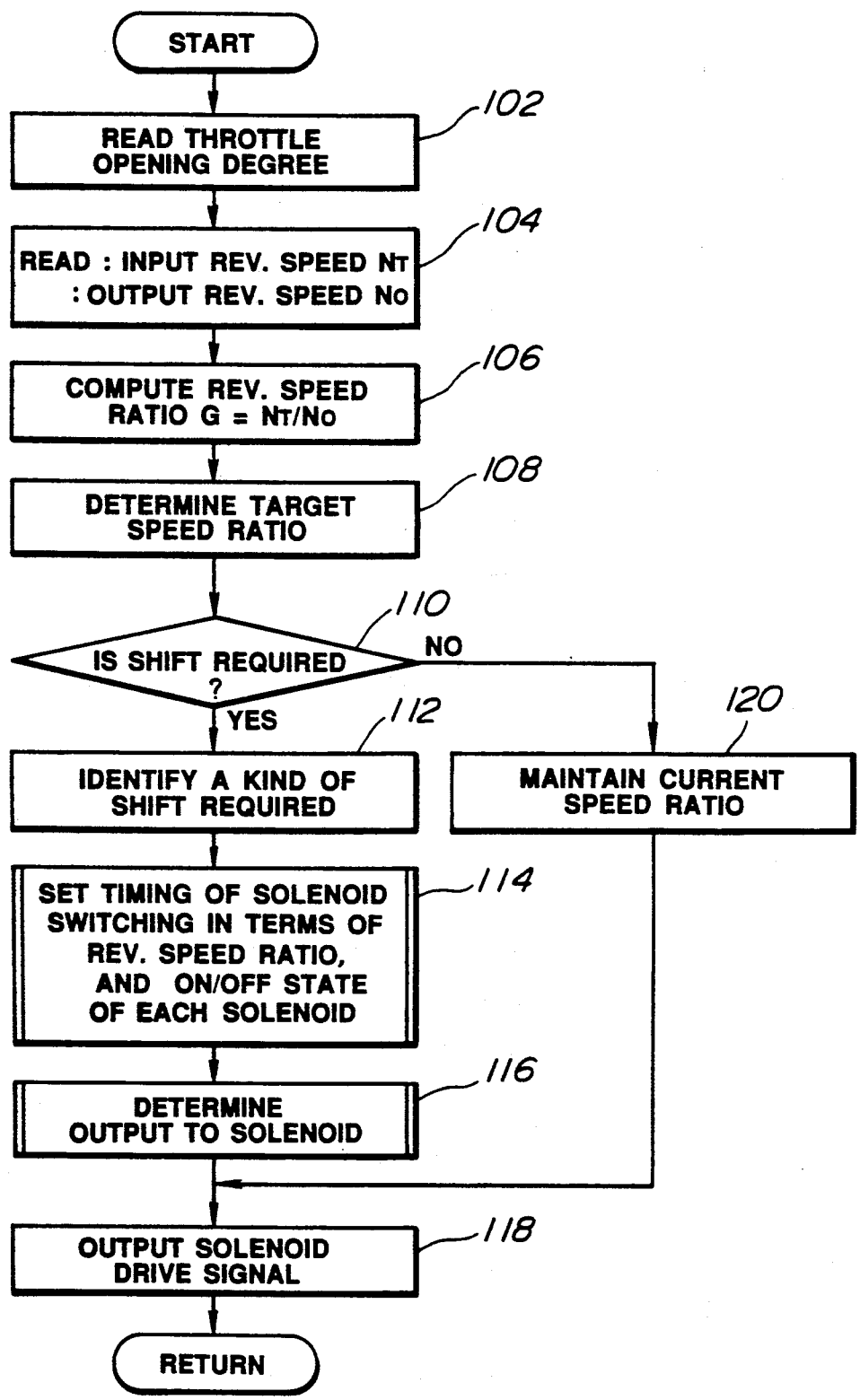
FIG. 6 a flow chart of a main routine.

The control unit 300 executes a shift control as follows. FIG. 6 shows the main flow of the shift control. First of all, a throttle opening degree is obtained by read-in operation at a step 102, an input shaft revolution speed $N_T$ and an output shaft revolution speed $N_O$ are obtained by read-in operations at a step 104. Nextly, a revolution speed ratio $G = N_T/N_O$ is computed on the variables $N_T$ and $N_O$. Then, an appropriate speed ratio, namely a target speed ratio, which is suitable for the current circumstance in response to throttle opening degree and output shaft revolution speed is determined at a step 108. Next, it is judged whether a shift is required or not at a step 110 in response to a result from comparison of a current speed ratio with the target speed ratio. If the shift is required, a kind of the shift required is identified at a step 112. Then, the control proceeds to a step 114 where it sets timings, in terms of revolution speed ratio, at which the solenoids 64 and 66 should change their states, and it also sets ON/OFF states of the solenoid which are to be established after the shift at the step 114. The content of this step 114 is further described later in connection with FIG. 7. Then, the control proceeds to a step 116 where the content of an output to each of the solenoids is determined. The content of this step 116 is described later in connection with FIGS. 12 and 13. Then, the control proceeds to a step 118 where the solenoid drive signal is outputted. If it is judged at the step 110 that the shift is not required, the control proceeds to a step 120 where the current speed ratio is maintained.

Figure 8:
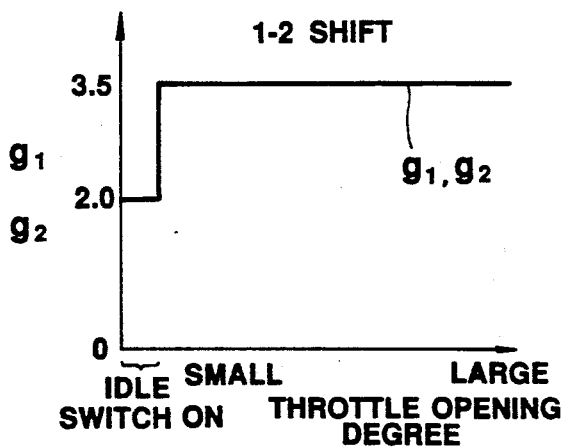
FIG. 8 is a graph showing a table containing data g1 and g2 versus various throttle opening degree values for use during 1-2 shift.
Figure 9:
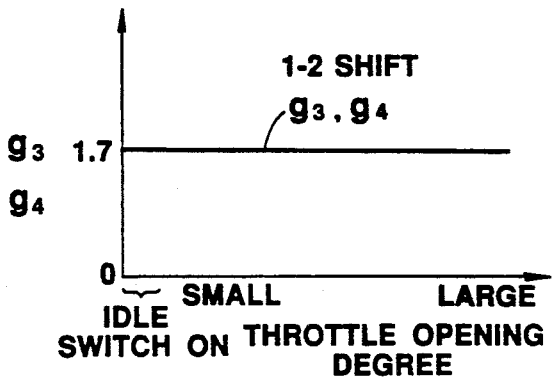
FIG. 9 is a graph showing a table containing data g3 and g4 versus various throttle opening degree values for use during 1-2 shift.
Figure 10:
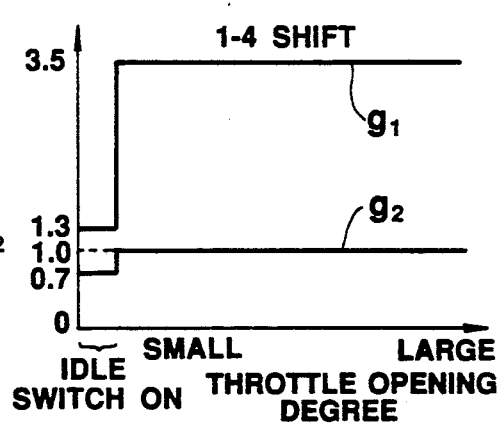
FIG. 10 is a graph showing a table containing data g1 and g2 versus various throttle opening degree values for use during 1-4 shift.
Figure 11:
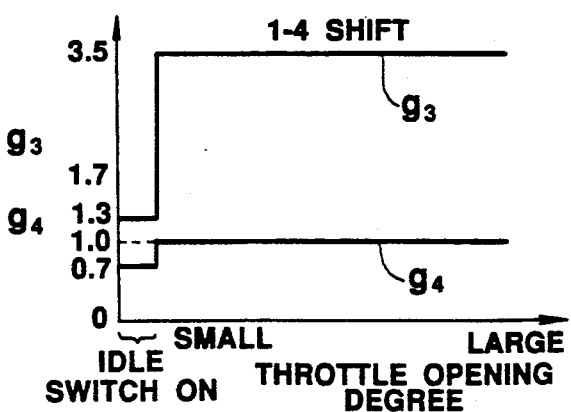
FIG. 11 is a graph showing a table containing data g3 and g4 versus various throttle opening degree values for use during 1-4 shift.

FIG. 7 shows a subroutine of the step 114. Firstly, states of the solenoid 64 before and after the shift required are set at the step 202, and states of the solenoid 66 before and after the shift required are set at a step 204. Then, switching timings g1 and g2 of the solenoid 64 are set, which timings are determined in response to a kind of the shift required, a throttle opening degree and state of the idle switch. Then, the switching timings g3 and g4 of the solenoid 66 are similarly set at a step 208. For example, for the 1-2 upshift, there are stored a table, for 1-2 upshift, containing data g1 and g2 as shown in FIG. 8, and a table containing data g3 and g4 as shown in FIG. 9. For the 1-4 upshift, there are stored a table containing data g1 and g2 as shown in FIG. 10, and a table containing data g3 and g4 as shown in FIG. 11.

Figure 12:
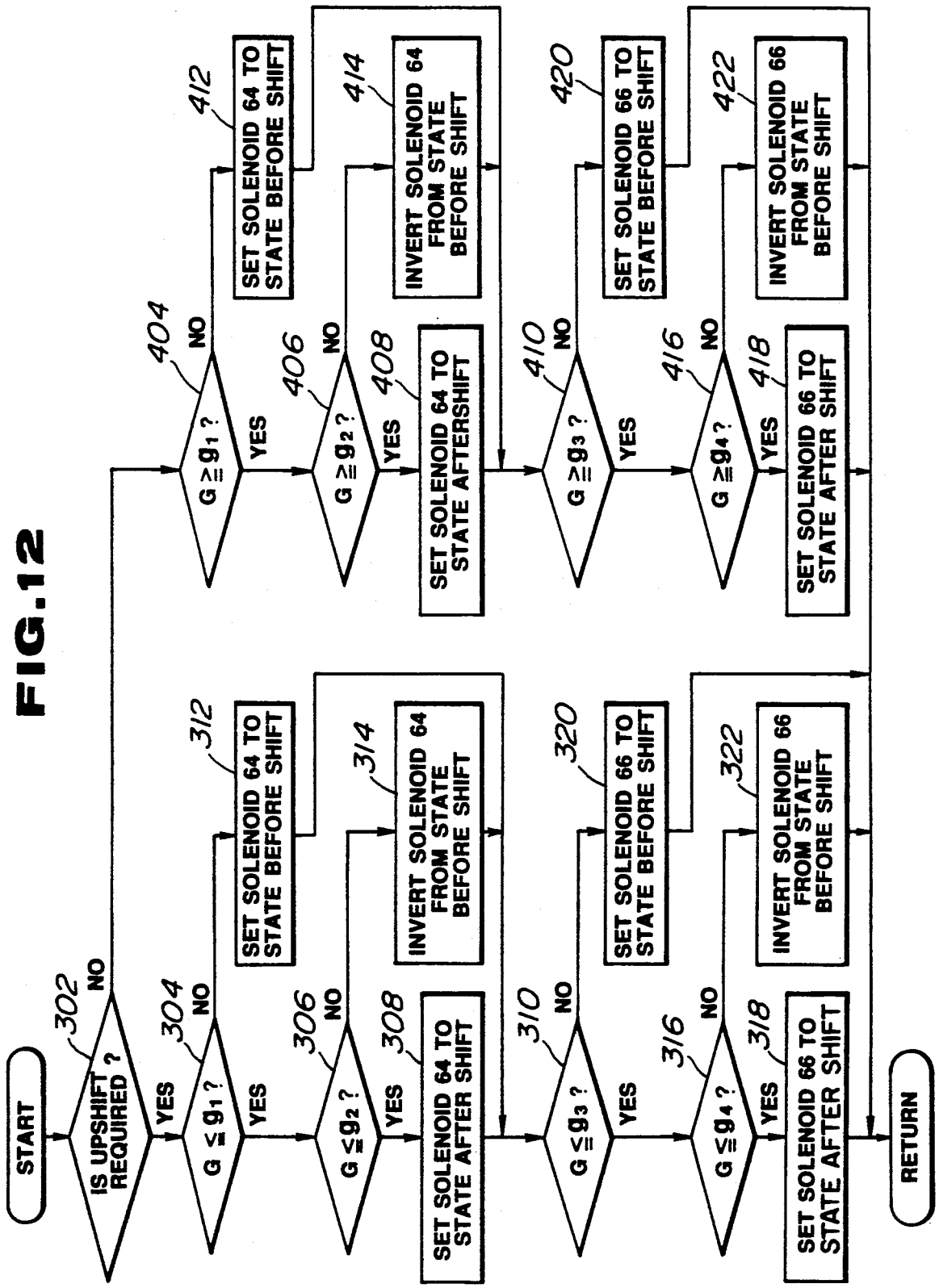
FIG. 12 is a flow chart of a subroutine.

FIG. 12 shows a subroutine of the step 116. Firstly, it is judged at a step 302 whether the shift required is an upshift or not. If the upshift is required, it is judged at a step 304 whether the revolution speed ratio G is less than or equal to the value g1. If G is less than or equal to g1, it is judged at a step 306 whether G is less than or equal to g2. If G is less than or equal to g2, the solenoid 64 is set at the state after the shift at a step 308. Then, the control proceeds to a step 310. If, at the preceding step 304, G is greater than g1, the control proceeds to a step 312 where the solenoid 64 is set at the state before the shift, and then proceeds to the step 310. If, at the step 306, G is greater than g2, the control proceeds to a step 314 where the state of the solenoid 64 is inverted from the state before the shift, and then it proceeds to the step 310. What is meant by inverting the state of the solenoid 64 from the state before the shift is to turn the solenoid 64 to an OFF state if it stays in an ON state before the shift or to turn the solenoid 64 to the ON state if it stays in the OFF state before the shift. At the step 310, it is judged whether G is less than or equal to g3 or not. If G is less than or equal to g3, the control proceeds to a step 316 where it is judged whether G is less than or equal to g4. If G is less than g4, the control proceeds to a step 318 where the state of the solenoid 66 is set to the state after the shift. If, at the step 310, G is greater than g3, the control proceeds to a step 320 where the solenoid 66 is set at the state before the shift, and if, at the step 316, G is greater than g4, the control proceeds to a step 322 where the solenoid 66 is inverted from the state before the shift.

If, at the step 302, it is determined that the shift required is not an upshift, that is, if the downshift is required, steps 404 to 422 are executed. These steps 404 to 422 are substantially the same as the counterparts 304 to 322, respectively, except the content of the steps 404, 406, 410, and 416. It will be seen from FIG. 12 that although the less-than sign is used in each of the steps 304, 306, 310, and 316, the greater-than sign is used in each of the steps 404, 406, 410, and 416.

Figure 13:
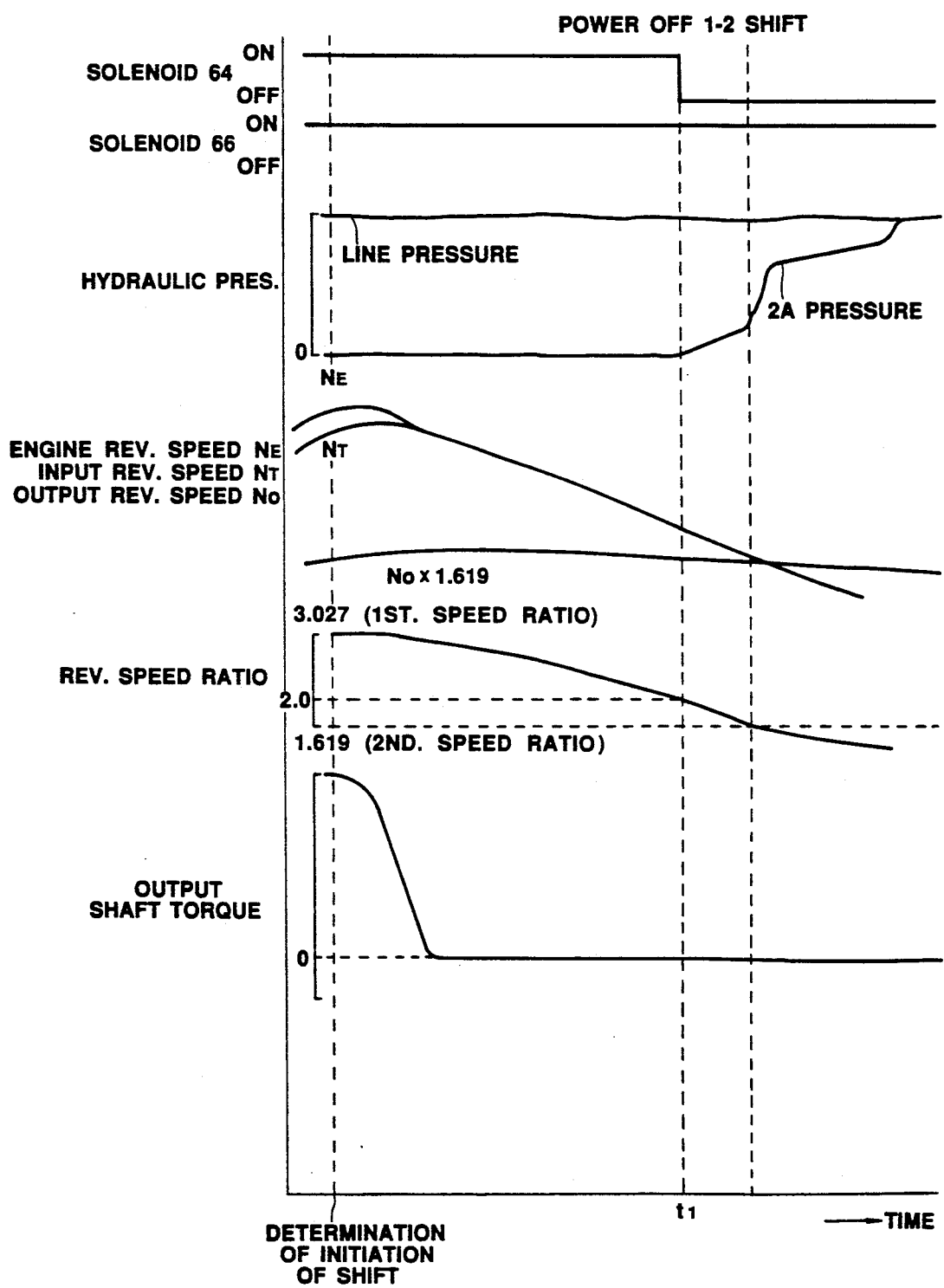
FIG. 13 is a time sequence chart showing shift characteristics during a power on 1-2 upshift.

According to the above-mentioned control, the solenoids 64 and 66 are controlled as shown in FIG. 13 during a power off 1-2 upshift, and various electric and hydraulic signals vary as shown in this figure. That is, since the power off shift is to be effected, a value of 2.0 is set as g1 and g2, while a value of 1.7 is set as g3 and g4. Therefore, the solenoids 64 and 66 are kept at the states before the shift until the actual revolution speed ratio G drops down to 2.0. Since the throttle opening degree is set at zero, the one-way clutch 30 begins to idle, and when the revolution speed ratio gradually decreases from the first speed ratio state where the revolution speed ratio is 3.027 down to 2.0 (at the time $t_1$), the solenoid 64 is switched to the state after the shift. That is, the solenoids 64 and 66 are set at the second speed ratio state. Thus, the revolution speed ratio thereafter varies smoothly without any interruption of its continuity. As a result, the output shaft torque is not subject to any substantial variation upon engagement of the frictional device, thus providing a shock-less shift.

Figure 14:
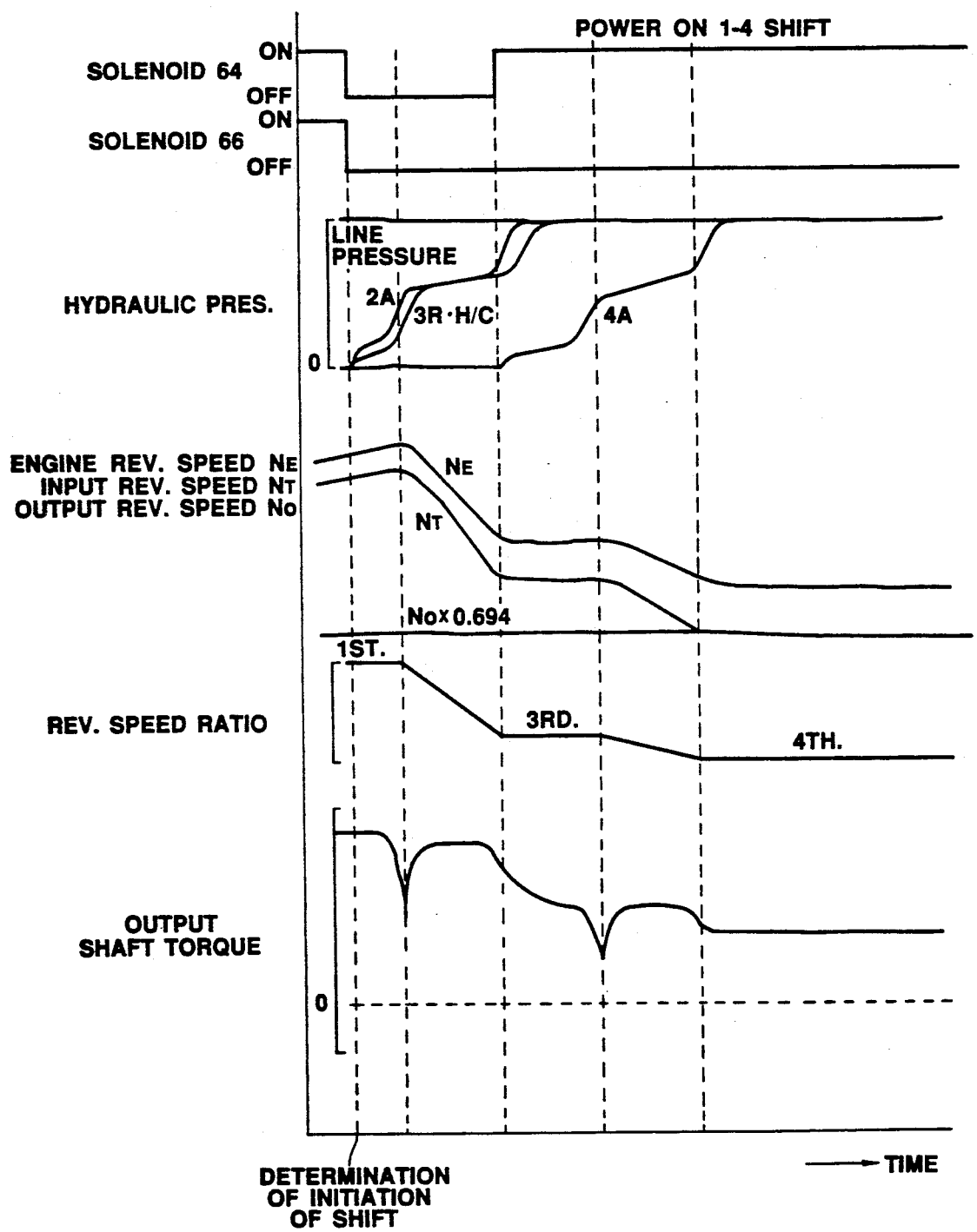
FIG. 14 is a time sequence chart showing shift characteristics during a power on 1-4 upshift.

Next, a power on 1-4 upshift is described. As shown in FIG. 14, the power on the 1-4 upshift progresses. In this case, as shown in FIGS. 10 and 11, g1 = 3.5, g2 = 1.0, g3 = 3.5, and g4 = 1.0 are set, respectively. Since G = 3.027 which is established at the first speed ratio is less than g1 = 3.5, the state of the solenoid 64 is inverted from the state before the shift and the solenoid 66 is inverted from the state before the shift, too, and they hold these inverted states until G drops down to 1.0, the solenoids 64 and 66 take the states after the shift, thus causing the fourth speed ratio to be established. As described above, the third speed ratio is momentarily established during the upshift from the first speed ratio to the fourth speed ratio.

Figure 15:
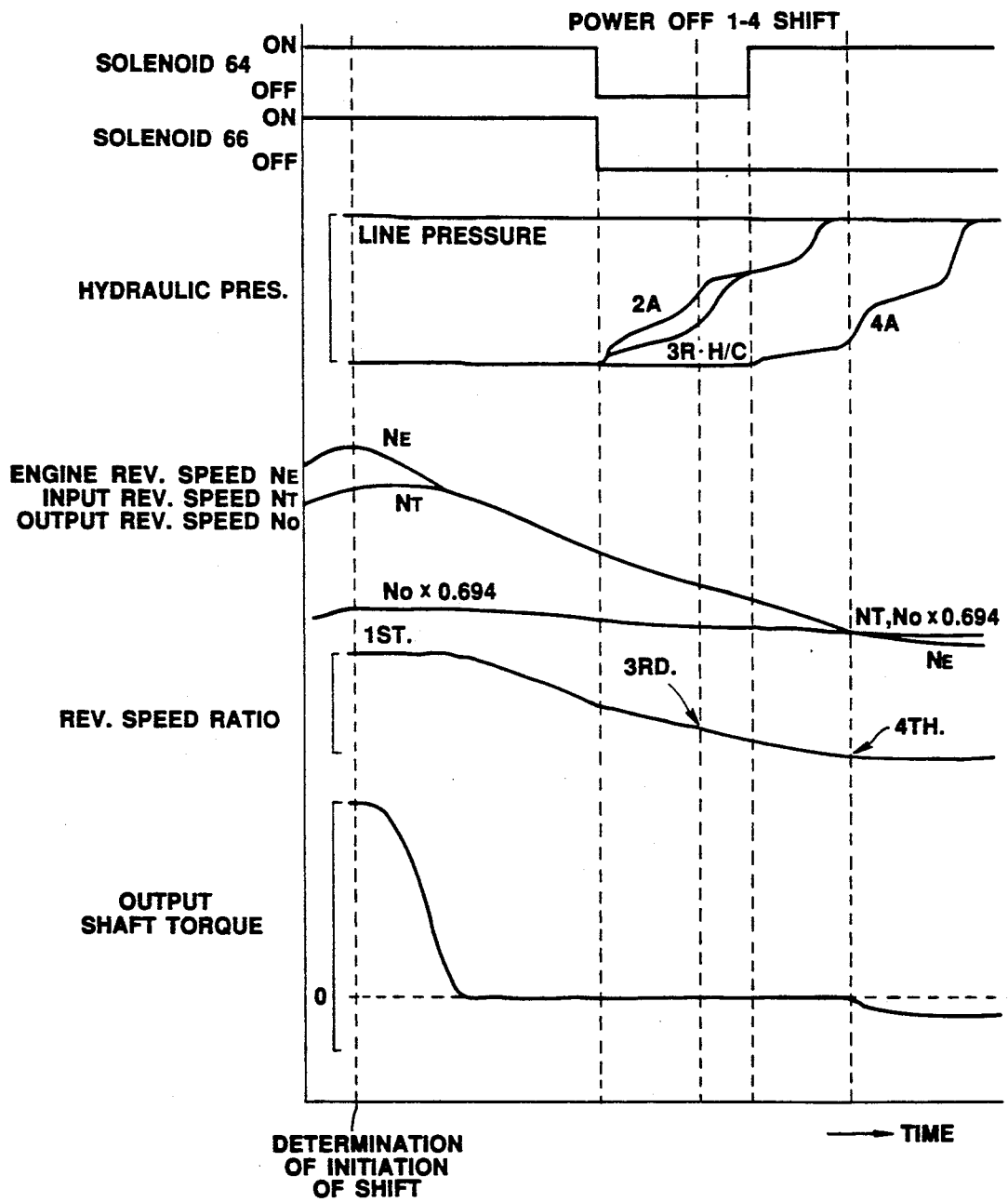
FIG. 15 is a time sequence chart showing shift characteristics during a power off 1-4 upshift.

For a power off 1-4 upshift, different values are set as g1, g2, g3, and g4, so that the shift progresses as shown in FIG. 15 during the shift. In this case, too, the solenoids 64 and 66 shift their states when the revolution speed ratio has varied to predetermined value or values, so that the shift timing is stabilized and the shift shock is alleviated.

Second Embodiment

Figure 16:
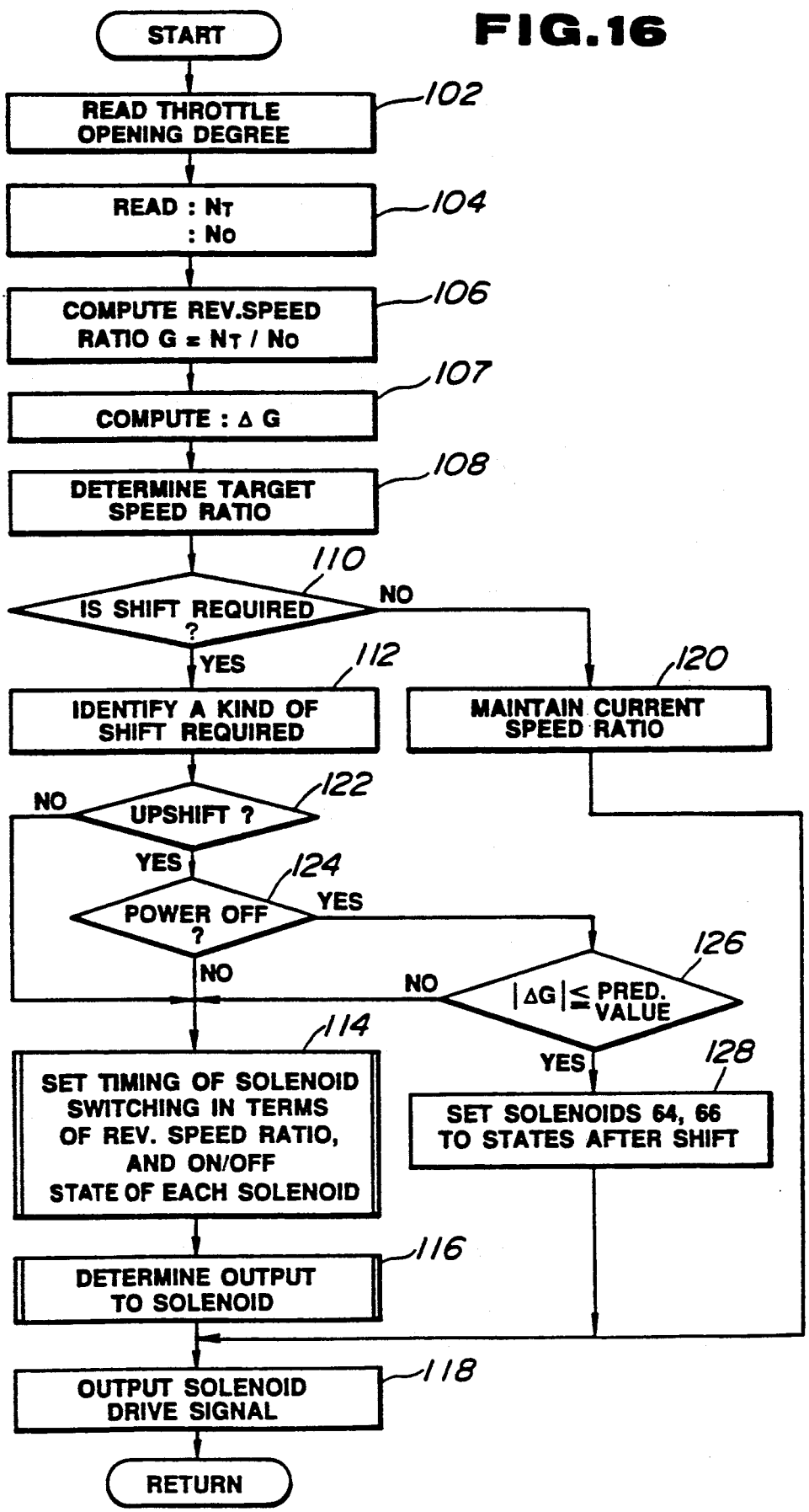
FIG. 16 is a flow chart of a main routine used in a second embodiment.
Figure 17:
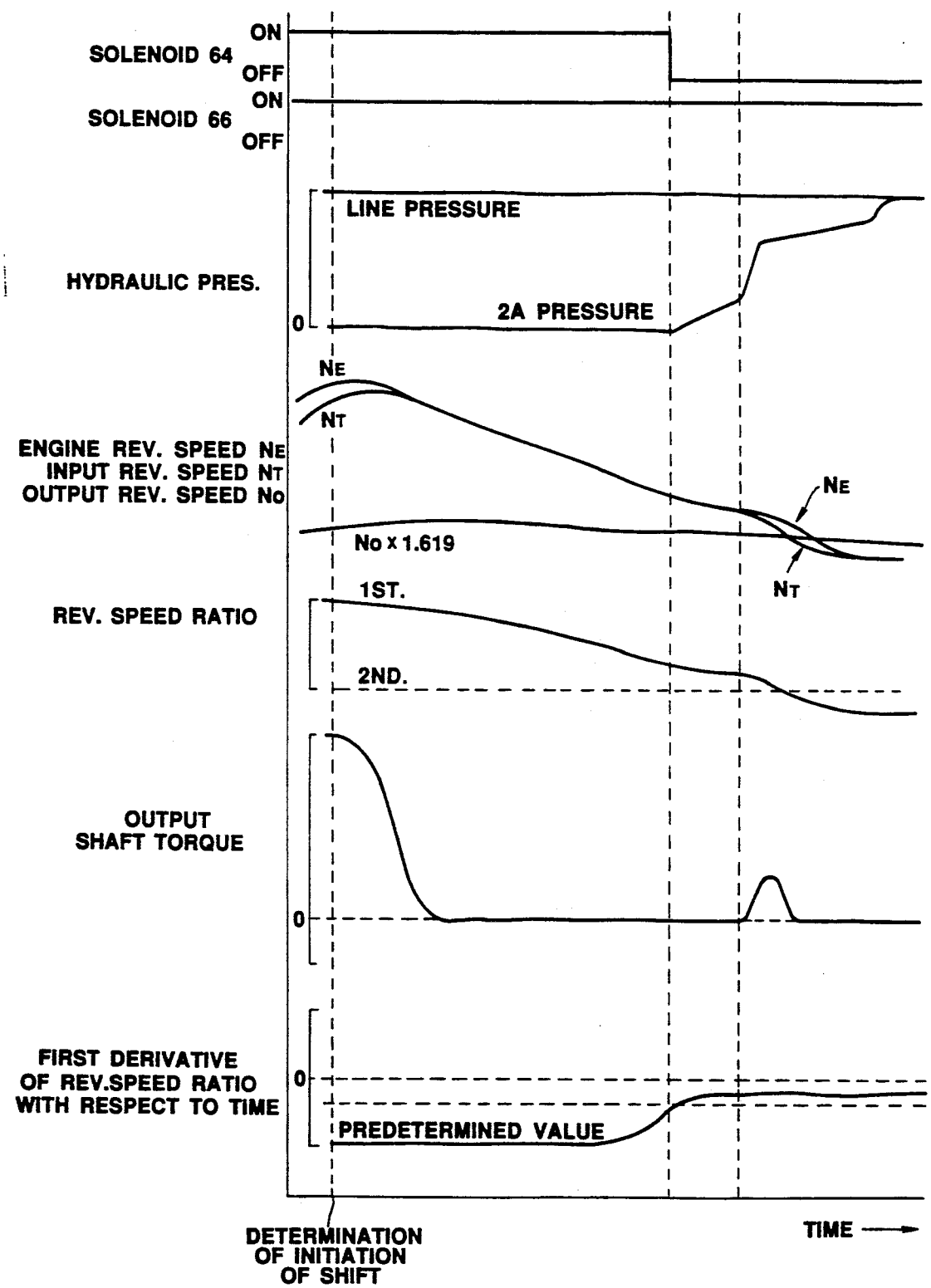
FIG. 17 is a time sequence chart showing shift characteristics provided by the second embodiment.

FIG. 16 shows a second embodiment. This second embodiment is different from the first embodiment in that a main routine as shown in FIG. 16 is used which is different from its counterpart shown in FIG. 6. The other construction is similar to that of the first embodiment. In the main routine as shown in FIG. 16, there are additionally provided steps 107, 122, 124, 126, and 128. At the step 107, the first derivative of the revolution speed ratio G with respect to time, namely ΔG (delta G), is computed. Besides, after executing a step 112 where a kind of a shift required is identified, it is judged whether the shift required is an upshift or not (at a step 122), whether it is a power off shift or not (namely, whether the idle switch is in the ON state or not) (at a step 124), and whether the absoulte value of the first derivative of the revolution speed ratio ΔG (delta G) is less than or equal to a predetermined value or not (at a step 126). When the first derivative of the revolution speed ratio ΔG (delta G) is less than the predetermined value, the solenoids 64 and 66 are set at the states after the shift (at a step 128). According to this control strategy, the states of the solenoids 64 and 66 are switched to the states after the shift when the first derivative of the revolution speed ratio ΔG (delta G) is less than the predetermined value regardless of the other conditions. This ensures a power off upshift. That is, when the engine revolution speed increases to a high revolution speed state owing to operation of a choke, there is the likelihood that since the input revolution speed $N_T$ is elevated also, the revolution speed ratio G does not drop down to a predetermined value, so that for example, in the case of a 1-2 upshift, the first speed ratio is maintained. However, as illustrated in the second embodiment, the second speed ratio state is established necessarily when the first derivative of the revolution speed ratio ΔG becomes less than or equal to the predetermined value, so that an 1-2 upshift is ensured. FIG. 17 shows how this shifting operation progresses during the shift according to the second embodiment.

THIRD EMBODIMENT

Figure 18:
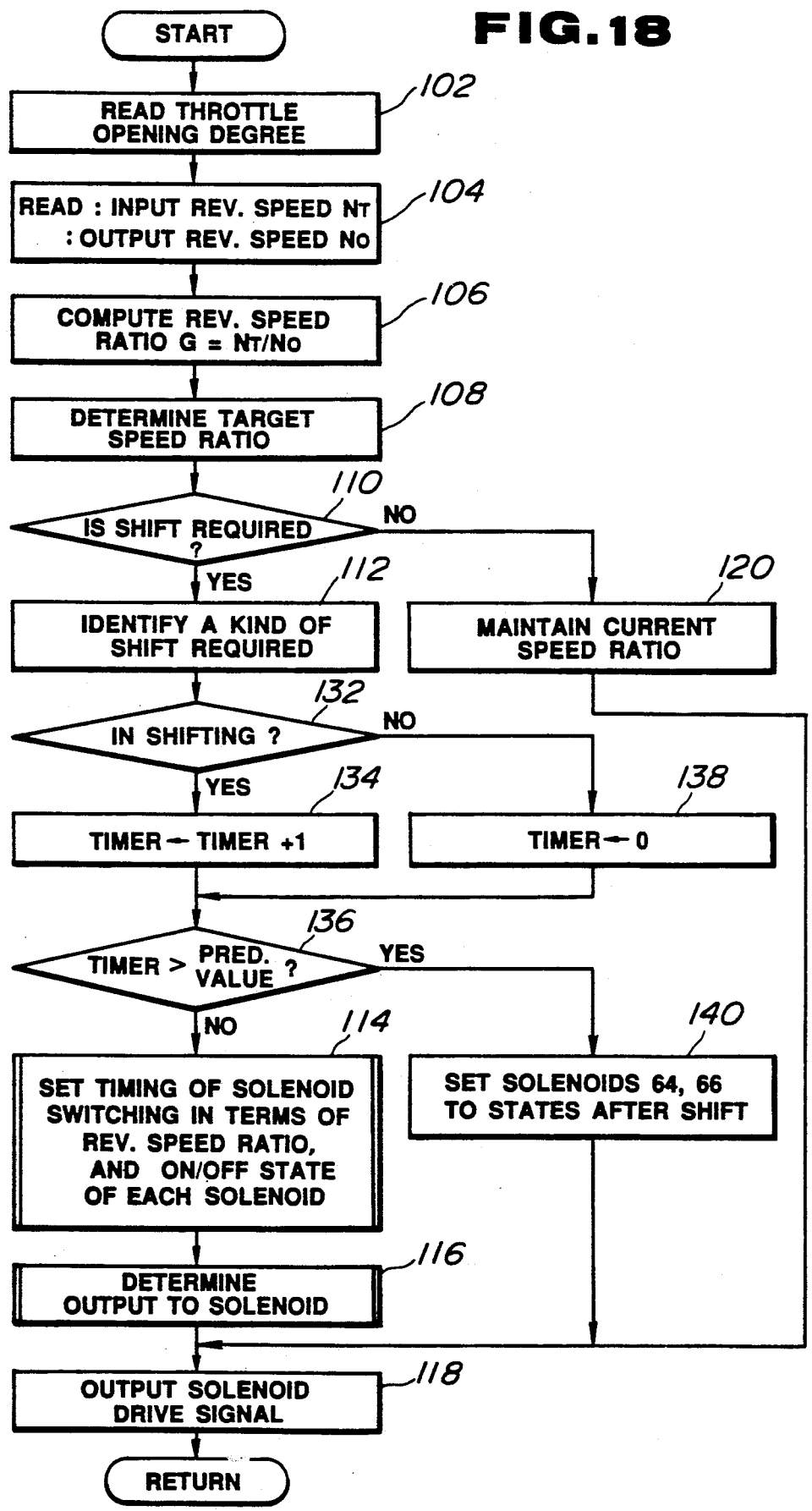
FIG. 18 is a flow chart of a main routine used by the third embodiment.
Figure 19:
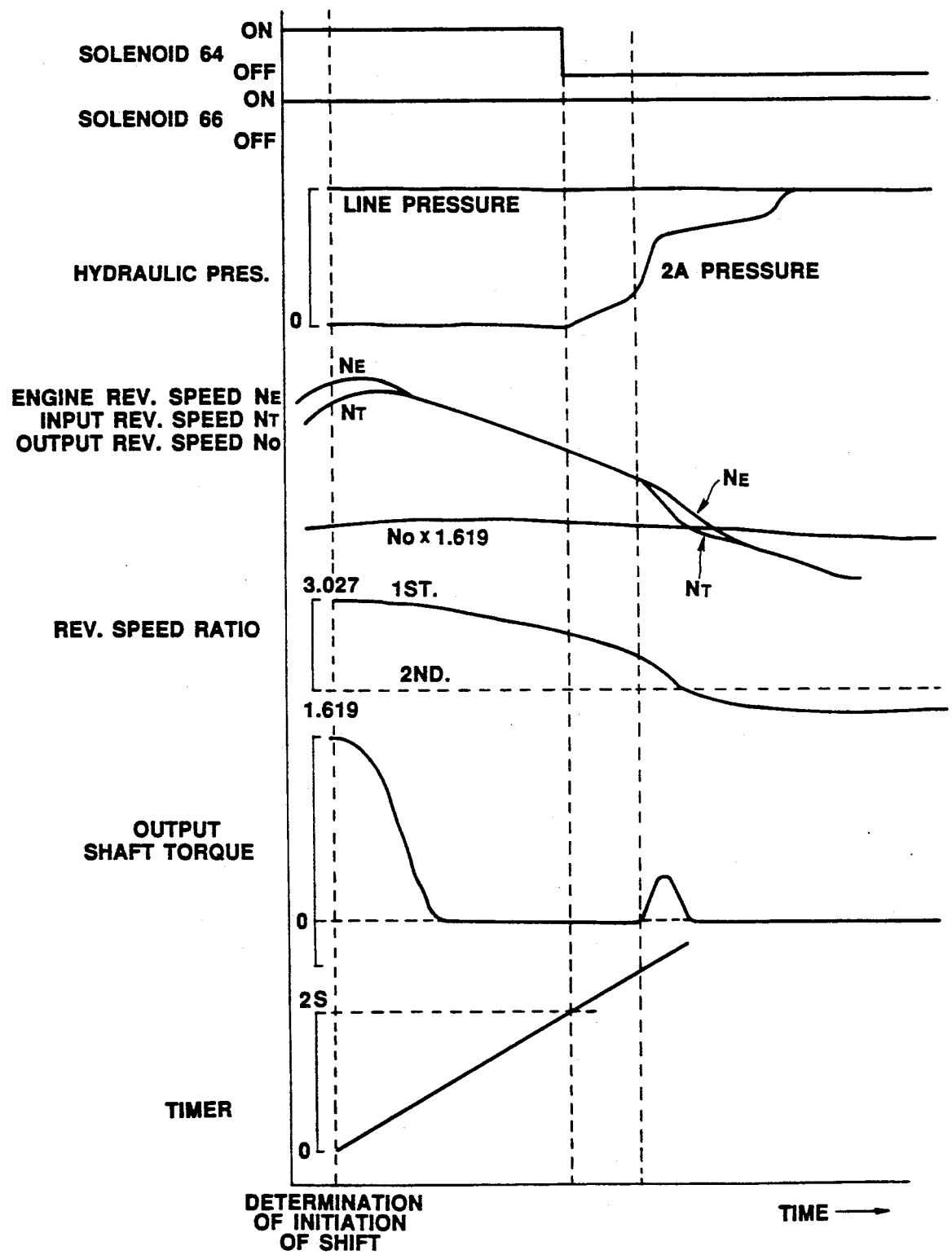
FIG. 19 is a time sequence chart showing shift characteristics provided by the third embodiment.

FIG. 18 shows a third embodiment. This embodiment is conceived to effect a power off upshift even if engine revolution speed is elevated. That is, as shown in FIG. 18, after executing a step 132 where a kind of a shift required is identified, it is judged whether the shift is in progress or not (at a step 132). If it is judged at this step that the shift is in progress, the content of the TIMER is increased by one. When the content of the TIMER increases and becomes greater than a predetermined value (see step 136), the states of the solenoids 64 and 66 are set to the states after the shift. As a result, it is now assured that upon expiration of a predetermined period of time after the initiation of a shift has been determined, the states of the solenoids 64 and 66 are switched to the states after the shift. As a result, even if the engine revolution speed is elevated owing to the action of a choke, a power off 1-2 upshift, for example, is always made. In this case, the shift operation progresses as shown in FIG. 19.

What is claimed is:

1. A shift control system for an automatic transmission including an input shaft and an output shaft, the automatic transmission being shiftable from one speed ratio to another speed ratio, the shift control system, comprising:

means for detecting a revolution speed of the input shaft and generating an input shaft revolution speed indicative signal indicative of said revolution speed of the input shaft detected;

means for detecting a revolution speed of the output shaft and generating an output shaft revolution speed indicative signal indicative of said revolution speed of the output shaft detected;

shift solenoids having a first state corresponding to the one speed ratio and a second state corresponding to the another speed ratio; and a control unit receiving said input and output shaft revolution speed indicative signals, said control unit being operative to compute a revolution speed ratio of said input shaft revolution speed indicative signal to said output shaft revolution speed indicative signal, determining whether or not a shift is required, identify said shift required, compare said revolution speed ratio computed with timing speed data for said shift required and identified, and control said shift solenoids in response to a result from comparing said revolution speed ratio computed with said timing data.

2. A shift control system for an automatic transmission of an automotive vehicle including an engine with a throttle with an idle speed position, the automatic transmission including an input shaft and an output shaft, the automatic transmission being shiftable from one speed ratio to another speed ratio, the shift control system, comprising:

an idle switch operative to detect the idle speed position and generate an idle speed position indicative signal;

means for detecting a revolution speed of the input shaft and generating an input shaft revolution speed indicative signal indicative of said revolution speed of the input shaft detected;

means for detecting a revolution speed of the output shaft and generating an output shaft revolution speed indicative signal indicative of said revolution speed of the output shaft detected;

shift solenoids having a first state corresponding to the one speed ratio and a second state corresponding to the another speed ratio; and a control unit receiving said input and output shaft revolution speed indicative signals, said control unit being operative to compute a revolution speed ratio of said input shaft revolution speed indicative signal to said output shaft revolution speed indicative signal and generate a revolution speed ratio indicative signal indicative of said revolution speed ratio computed, compute a first derivative, with respect to time, of said revolution speed ratio indicative signal and generate a first derivative indicative signal indicative of said first derivative computed, determine whether or not a shift is required, identify said shift required, determine whether or not said shift required is an upshift, determine responsive to said idle speed position indicative signal whether or not a power off upshift is required when it is determined that said shift required is an upshift and generate a power off upshift indicative signal indicative of a fact that the power off upshift is required, compare said first derivative indicative signal with a predetermined value when said power off upshift indicative signal is generated and determined whether or not said first derivative indicative signal has attained a predetermined relationship with said predetermined value, set said shift solenoids to said second state when it is determined that said first derivative indicative signal has attained said predetermined relationship with said predetermined value, compare said revolution speed ratio indicative signal with timing data for said shift required and identified when said power off upshift indicative signal is not generated or it is determined that said first derivative indicative signal fails to attain said predetermined relationship with said predetermined value, and control said shift solenoids in response to a result from comparing said revolution speed ratio computed with said timing data.

3. A shift control system for an automatic transmission of an automotive vehicle, the automatic transmission including an input shaft and an output shaft, the automatic transmission being shiftable from one speed ratio to another speed ratio, the shift control system, comprising:

means for detecting a revolution speed of the input shaft and generating an input shaft revolution speed indicative signal indicative of said revolution speed of the input shaft detected;

means for detecting a revolution speed of the output shaft and generating an output shaft revolution speed indicative signal indicative of said revolution speed of the output shaft detected;

shift solenoids having a first state corresponding to the one speed ratio and a second state corresponding to the another speed ratio; and a control unit receiving said input and output shaft revolution speed indicative signals, said control unit being operative to compute a revolution speed ratio of said input shaft revolution speed indicative signal to said output shaft revolution speed indicative signal and generate a revolution speed ratio indicative signal indicative of said revolution speed ratio computed, determine whether or not a shift is required, identify said shift required, determine whether or not said shift required progresses and generate a shift progress indicative signal indicative of a fact that said shift required progresses, increment a timer in response to generation of said shift progress indicative signal and generate a timer indicative signal indicative of a content of said timer, compare said timer indicative signal with a predetermined value to determine whether or not said timer indicative signal is greater than a predetermined value, set said shift solenoids to said second state when said timer indicative signal is greater than said predetermined value in response to result from comparing said timer indicative signal with said predetermined value, compare said revolution speed ratio indicative signal with said reference revolution speed data for said shift required and identified when said timer indicative signal fails to be greater than said predetermined value in response to result from comparing said timer indicative signal with said predetermined value, and control said shift solenoids in response to a result from comparing said revolution speed ratio computed with said timing data.

4. A method of controlling a shift made in an automatic transmission, the automatic transmission including an input shaft and an output shaft, the automatic transmission being shiftable from one speed ratio to another speed ratio, the automatic transmission having shift solenoids having a first state corresponding to the one speed ratio and a second state corresponding to the another speed ratio for effecting a shift in the automatic transmission from the one speed ratio to the another speed ratio, the method comprising the steps of:

A) detecting a revolution speed of the input shaft and generating an input shaft revolution speed indicative signal indicative of said revolution speed of the input shaft detected;

B) detecting a revolution speed of the output shaft and generating an output shaft revolution speed indicative signal indicative of said revolution speed of the output shaft detected;

C) computing a revolution speed ratio of said input shaft revolution speed ratio indicative signal to said output shaft revolution speed indicative signal and generating a revolution speed ratio indicative signal indicative of said revolution speed ratio computed;

D) determining whether or not a shift is required;

E) identifying said shift required;

F) comparing said revolution speed ratio indicative signal with timing data for said shift required and identified; and G) controlling the shift solenoids in response to a result from comparing said revolution speed ratio indicative signal with said timing data.

5. A method of controlling a shift taking place in an automatic transmission of an automotive vehicle including an engine with a throttle with an idle speed position and an idle switch which is operative to detect the idle speed position and generate an idle speed position indicative signal, the automatic transmission including an input shaft and an output shaft, the automatic transmission being shiftable from one speed ratio to another speed ratio, the automatic transmission having shift solenoids having a first state corresponding to the one speed ratio and a second state corresponding to the another speed ratio for effecting a shift in the automatic transmission from the one speed ratio to the another speed ratio, the method comprising the steps of:

A) detecting a revolution speed of the input shaft and generating an input shaft revolution speed indicative signal indicative of said revolution speed of the input shaft detected;

B) detecting a revolution speed of the output shaft and generating an output shaft revolution speed indicative signal indicative of said revolution speed of the output shaft detected;

C) computing a revolution speed ratio of said input shaft revolution speed indicative signal to said output shaft revolution speed indicative signal and generating a revolution speed ratio indicative signal indicative of said revolution speed ratio computed;

D) computing a first derivative, with respect to time, of said revolution speed ratio indicative signal and generating a first derivative indicative signal indicative of said first derivative computed;

E) determining whether or not a shift is required;

identifying said shift required;

determining whether or not said shift required is an upshift;

F) determining responsive to the idle speed position indicative signal whether or not a power off upshift is required when it is determined that said shift required is an upshift and generating a power off upshift indicative signal indicative of a fact that the power off upshift is required;

G) comparing said first derivative indicative signal with a predetermined value when said power off upshift indicative signal is generated and determining whether or not said first derivative indicative signal has attained a predetermined relationship with said predetermined value;

H) setting the shift solenoids to the second state when it is determined that said first derivative indicative signal has attained said predetermined relationship with said predetermined value;

I) comparing said revolution speed ratio indicative signal with said reference revolution speed data for said shift required and identified when said power off upshift indicative signal is not generated or it is determined that said first derivative indicative signal fails to attain said predetermined relationship with said predetermined value; and J) controlling the shift solenoids in response to a result from comparing said revolution speed ratio computed with said timing data.

6. A method of controlling a shift taking place in an automatic transmission, the automatic transmission including an input shaft and an output shaft, the automatic transmission being shiftable from one speed ratio to another speed ratio, the automatic transmission having shift solenoids having a first state corresponding to the one speed ratio and a second state corresponding to the another speed ratio for effecting a shift in the automatic transmission from the one speed ratio to the another speed ratio, the method comprising the steps of:

A) detecting a revolution speed of the input shaft and generating an input shaft revolution speed indicative signal indicative of said revolution speed of the input shaft detected;

B) detecting a revolution speed of the output shaft and generating an output shaft revolution speed indicative signal indicative of said revolution speed of the output shaft detected;

C) computing a revolution speed ratio of said input shaft revolution speed indicative signal to said output shaft revolution speed indicative signal and generating a revolution speed ratio indicative signal indicative of said revolution speed ratio computed;

D) determining whether or not a shift is required;

E) identifying said shift required;

F) determining whether or not said shift required progresses and generating a shift progress indicative signal indicative of a fact that said shift required progresses;

G) incrementing a timer in response to generation of said shift progress indicative signal and generating a timer indicative signal indicative of a content of said timer;

H) comparing said timer indicative signal with a predetermined value;

I) setting the shift solenoids to the second state when said timer indicative signal is greater than said predetermined value in response to result from comparing said timer indicative signal with said predetermined value;

J) setting reference revolution speed data for said shift required and identified when said timer indicative signal fails to be greater than said predetermined value in response to result from comparing said timer indicative signal with said predetermined value;

K) comparing said revolution speed ratio indicative signal with said reference revolution speed data which has been set; and L) controlling said shift solenoids in response to a result from comparing said revolution speed ratio computed with said timing data.

* * * * *